(12) United States Patent
Kimura (10) Patent No.: US 8,672,301 B2
(45) Date of Patent: Mar. 18, 2014

(54) OVERHEAD WIRE TENSION BALANCER DEVICE AND DEVICE ADAPTED TO PREVENT LUBRICATING OIL BEING SCATTERED, AND USED WITH THE OVERHEAD WIRE TENSION BALANCER

(75) Inventor: Toru Kimura, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 698 days.

(21) Appl. No.: 12/735,308

(22) PCT Filed: May 28, 2009

(86) PCT No.: PCT/JP2009/059811
§ 371 (c)(1),
(2), (4) Date: Jul. 1, 2010

(87) PCT Pub. No.: WO2009/147995
PCT Pub. Date: Dec. 10, 2009

(65) Prior Publication Data
US 2010/0289196 A1    Nov. 18, 2010

(30) Foreign Application Priority Data
Jun. 5, 2008 (JP) ................................ 2008-147999

(51) Int. Cl.
*F16F 1/00* (2006.01)
(52) U.S. Cl.
USPC ...................... 267/73; 267/64.26; 174/40 TD
(58) Field of Classification Search
USPC ................ 267/73, 64.26; 174/40 TD; 285/13
See application file for complete search history.

(56) References Cited

U.S. PATENT DOCUMENTS

| | | | | |
|---|---|---|---|---|
| 4,457,497 A | * | 7/1984 | Ojima | ........................... 267/134 |
| 2011/0089618 A1 | * | 4/2011 | Kimura | ........................... 267/73 |
| 2011/0253443 A1 | * | 10/2011 | Sasa | ......................... 174/40 TD |

FOREIGN PATENT DOCUMENTS

| | | | |
|---|---|---|---|
| CN | 2531011 Y | | 1/2003 |
| JP | A 11-048834 | | 2/1999 |
| JP | 2000158980 A | * | 6/2000 |
| JP | 2001195936 A | * | 7/2001 |
| JP | 2004042780 A | * | 2/2004 |
| JP | A 2006-226086 | | 8/2006 |
| JP | 2011-240804 A | * | 12/2011 |

OTHER PUBLICATIONS

Mar. 1, 2012 Office Action issued in Chinese Patent Application No. 200980101746.9 (with translation).
International Search Report issued in corresponding International Application No. PCT/JP2009/059811, mailed Aug. 11, 2009 (with English-language translation).

* cited by examiner

*Primary Examiner* — Pamela Rodriguez
(74) *Attorney, Agent, or Firm* — Oliff PLC (57) ABSTRACT

An overhead wire tension balancer has a water draining structure and can prevent lubricating oil in the tension balancer from scattering to the outside. The overhead wire tension balancer is for supporting a spanned overhead wire while applying tension thereto, and rainwater collecting inside the overhead wire tension balancer is collected from a collecting pipe connecting part into a collecting tank through a collecting pipe. The oil content of grease applied to the inside of the overhead wire tension balancer is prevented from scattering to the outside even if the oil content is carried together with the rainwater.

3 Claims, 10 Drawing Sheets

OVERHEAD WIRE TENSION BALANCER DEVICE AND DEVICE ADAPTED TO PREVENT LUBRICATING OIL BEING SCATTERED, AND USED WITH THE OVERHEAD WIRE TENSION BALANCER

BACKGROUND OF THE INVENTION

1. Technical Field

The present invention relates to an overhead wire tension balancer device and to a technique in which the device can be used.

2. Background Art

As a device for applying appropriate tension to an overhead wire of railroad, an overhead wire tension balancer having a coil spring has been disclosed (See reference 1). The overhead wire tension balancer has a structure in which plural cylinders are coaxially arranged, and tension is generated because of elasticity of the spring in the case in which the inner cylinder is pulled out of the outer cylinder. Therefore, it must have a structure in which the outer cylinder and the inner cylinder are relatively movable. Since there may be a case in which rainwater enters into the gap between the outer cylinder and the inner cylinder, it has a water draining structure such as a water draining hole, gap or the like.

In the overhead wire tension balancer, a coil spring is contained so as to apply tension to the overhead wire. Since the spring is in frictional contact with the inner surface of the cylinder or the outer surface of the inner cylinder during above-mentioned movement of the cylinders, a grease as a lubricating agent is applied on a contacting portion of the coil spring and the cylinder.

The reference mentioned above is Japanese Unexamined Patent Application Publication No. Heisei 11 (1999)-48834.

DISCLOSURE OF THE INVENTION

In an overhead wire tension balancer having the above-mentioned structure, there may be a problem in that the oil component of the grease may be scattered from the water draining hole to the outside and in that it may contaminate a pillar supporting the tension balancer or surface of a rail. As a result of the present inventors' research of this phenomenon, the following has been determined. First, although the grease itself has high viscosity, there is a tendency for the oil component to become separated and become a fluid component over time. This tendency is significant in the case in which rainwater coming from the water draining hole contacts the grease. In addition, the overhead wire tension balancer is sometimes arranged so as to be inclined in an axial direction, and depending on the situation of the arrangement, there may be a case in which the inclination of the arrangement aids the entry of rainwater and scattering in specific directions.

In view of these circumstances, an object of the present invention is to provide an overhead wire tension balancer in which a water draining structure is employed and scattering of oil component due to an inner lubricating agent to the outside is controlled. Furthermore, an object of the present invention is to provide a technique for controlling scattering of an oil component from an inner lubricating agent to the outside, in the conventional overhead wire tension balancer having a water draining structure.

Some embodiments are directed to an overhead wire tension balancer device having cylindrical members arranged coaxially, a coil spring applying elastic force against relative extension of the cylindrical members in an axial direction, a lubricating agent coated on the coil spring, a draining means for draining rainwater retained in a gap between the cylindrical members to the outside, and a fluid collecting means for collecting a fluid that has flowed out of the draining means.

The number of the cylindrical member is not limited in particular, and the number can be two or more. The number of the coil springs is also not limited in particular. The lubricating agent is a coating agent which is applied or filled at a sliding part of the coil spring and the cylindrical member and which has lubrication property. For example, a grease that is commercially available for lubrication can be used.

In some embodiments, even if an oil component of the lubricating agent flows from the water draining means to the outside, it is collected by the fluid collecting means. Therefore, scattering of the oil component can be controlled. In addition, since the function of the water draining means is maintained, the function of draining rainwater which enters into the inside of the overhead wire tension balancer to the outside is not lost.

Some embodiments are directed to an overhead wire tension balancer device in which the water draining means is a hole or a gap, and the fluid collecting means is a pipe connected to the hole or the gap, in the invention of claim 1. According to the invention of claim 2, the oil component and rainwater can be collected from the hole or gap by the pipe, without being scattered to the outside of the overhead wire tension balancer.

Some embodiments are directed to a device for prevention of scattering lubricating oil, which is attached to the overhead wire tension balancer having a hole or gap for water draining, the device has a connecting member for collection connected to the hole or gap for water draining, a pipe connected to the connection member for collection, and an attaching member attaching the connecting member for collection and the pipe to the overhead wire tension balancer.

In some embodiments, by attaching it to the conventional overhead wire tension balancer having water draining means, the oil component and rainwater can be collected from the hole or gap by the pipe, without being scattered to the outside of the overhead wire tension balancer.

The overhead wire in which the overhead wire tension balancer using the above-mentioned invention is used, is not limited to an overhead wire for a railroad, and it can be kinds of electric power cable or electric signal cable that require being arranged and tensioned. In addition, the overhead wire can be a wire for supporting an electrical cable, a wire for carrying a load, or the like.

According to the present invention, while the water draining structure is employed, the overhead wire tension balancer which can control scattering of the oil component from the inner lubricating oil to the outside, can be provided. Furthermore, according to the present invention, in a conventional overhead wire tension balancer having a water draining structure, a technique that can control scattering of the oil component from the inner lubricating oil to the outside, can be provided.

EXPLANATION OF REFERENCE NUMERALS

100: Overhead wire tension balancer, 101: Outer cylindrical structural body, 102: Middle cylindrical structural body, 103: Inner cylindrical structural body, 104: Coil spring, 105: Coil spring, 106: Overhead wire attaching member, 108: U bar, 110: Cut part, 200: Supporting pillar, 201: Attaching band, 202: Attaching member, 203: Bolt, 204: Hanging member, 205: Supporting member, 206: Scaling plate, 207: Collecting pipe, 208: Fixing member, 209: Collecting pipe connecting part, 210: Attaching band, 211: Recovering tank, 210a: Tightening part, 210b: Tightening part, 212: Adjuster, 213: Bolt, 214: Supporting plate, 215: Adapter, 216: Draining tube.

BEST MODE FOR CARRYING OUT THE INVENTION (1) First Embodiment (Structure of Overhead Wire Tension Balancer)

Figure 1:
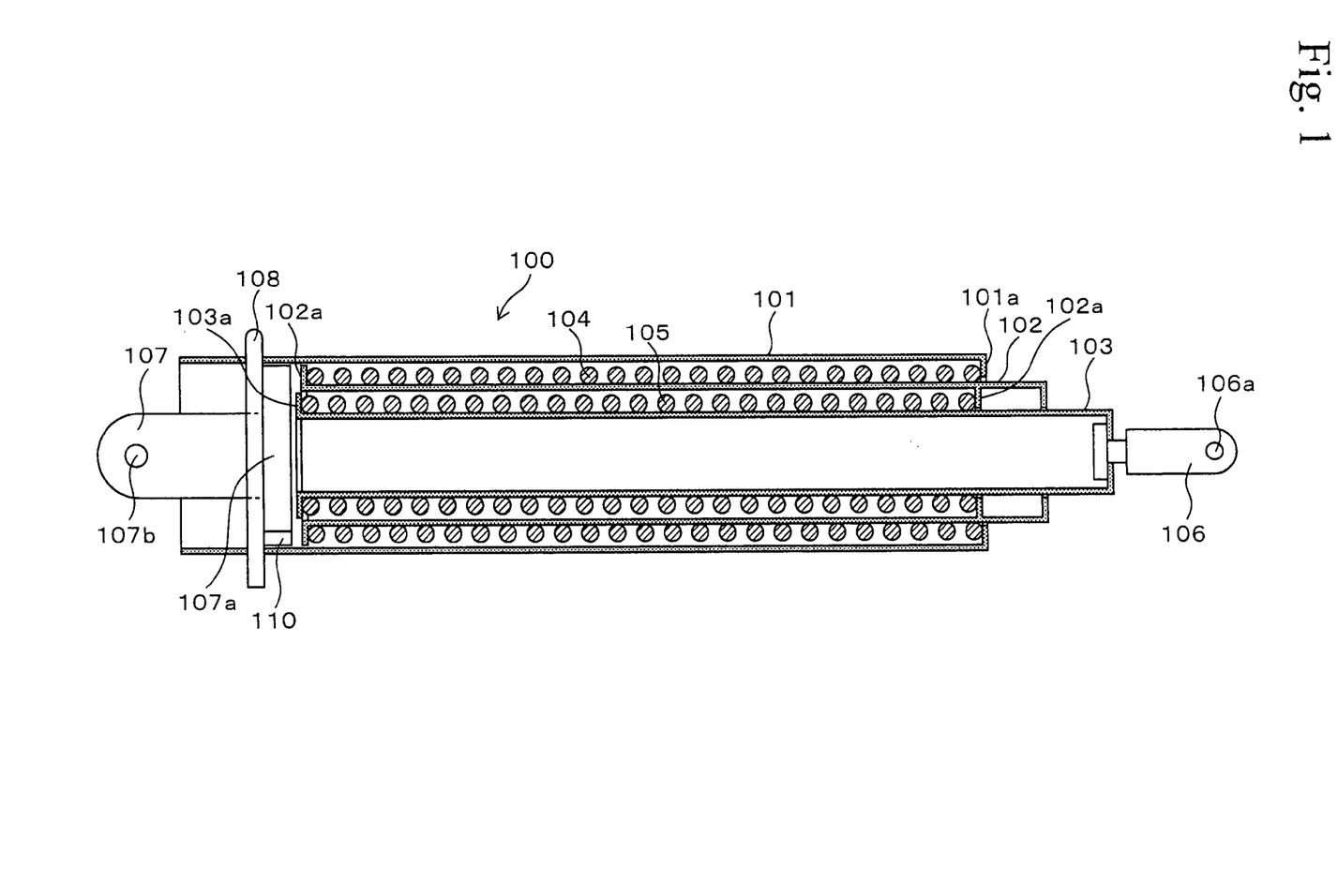
FIG. 1 is a cross sectional view showing the concept of an overhead wire tension balancer to which the present invention is applied.

First, one example of basic structure of overhead wire tension balancer to which the present invention is applied, is explained. FIG. 1 shows a cross sectional structure of the overhead wire tension balancer 100. The overhead wire tension balancer 100 has the outer cylindrical structural body 101, the middle cylindrical structural body 102 and the inner cylindrical structural body 103.

In a gap between the outer cylindrical structural body 101 and the middle cylindrical structural body 102, the coil spring 104 in a compressed condition is contained. In the situation shown in FIG. 1, the left edge of the coil spring 104 is contacted to the outer flange part 102a of the middle cylindrical structural body 102, and the right edge of the coil spring 104 is contacted to the inner flange part 101a of the outer cylindrical structural body 101.

In a gap between the middle cylindrical structural body 102 and the inner cylindrical structural body 103, the coil spring 105 in a compressed condition is contained. In the situation shown in FIG. 1, the left edge of the coil spring 105 is contacted to the outer flange part 103a of the inner cylindrical structural body 103, and the right edge of the coil spring 105 is contacted to the inner flange part 102a of the middle cylindrical structural body 102. At the parts at which the coil springs 104 and 105 are contacted to the cylindrical structural body, a grease for lubrication is applied or filled in so as not to inhibit relative sliding thereof.

At the right edge surface of the inner cylindrical structural body 103 in FIG. 1, the overhead wire attaching member 106 is fixed. The overhead wire 106 has the bolt hole 106a, and an overhead wire, not shown in the figure, is attached to the overhead wire attaching member 106 using this bolt hole 106a.

The overhead wire tension balancer 100 is supported on a supporting pillar, not shown in the figure, by the supporting member 107. More particularly, the flange part 107a of the supporting member 107 is pressed by the U bar 108, which is a fixing member, the supporting member 107 is maintained so as not to move in the relatively left direction of the figure against the outer cylindrical structural body 101. It should be noted that the U bar 108 is to be attached to the outer cylindrical structural body 101 by being inserted into the attaching hole from upward in the figure, which is formed on the outer cylindrical structural body 101. The bolt hole 107b is formed on the supporting member 107. The overhead wire tension balancer 100 is attached to a supporting pillar, not shown in FIG. 1, via this bolt hole 107b.

At the lower edge part of the flange part 107a of the supporting member 107, the part which is cut in a semicircular shape 110 is formed. This cut part 110 is a water draining hole which functions as the water draining means for draining rainwater that has entered inside the overhead wire tension balancer 100.

The overhead wire tension balancer 100 shown in FIG. 1 is used in a condition being inclined to the lower left in the figure. This condition, for example, corresponds to a situation in which an overhead wire is built at a slope being inclined to the lower left in the figure, or a situation in which an overhead wire is to be inclined to the lower left in the figure. The angle of inclination depends on the situation of arrangement. In the case in which the overhead wire tension balancer 100 is used in such a condition so as to be inclined to the lower left in the figure, rainwater may easily enter thereinto via a gap between the outer cylindrical structural body 101 and the middle cylindrical structural body 102 or a gap between the middle cylindrical structural body 102 and the inner cylindrical structural body 103 at the right side in the figure.

In the overhead wire tension balancer 100, because of its function, the outer cylindrical structural body 101 and the middle cylindrical structural body 102 are made to be mutually slidable in the axial direction, and furthermore, the middle cylindrical structural body 102 and the inner cylindrical structural body 103 are made to be mutually slidable in the axial direction. Therefore, the above-mentioned entry of rainwater via the gaps is difficult to avoid without employing a special water-proof structure. To drain rainwater that has entered inside to the outside, the cut part 110 is formed.

That is, the rainwater which entered from the gaps at the right side in the figure into the inside of the overhead wire tension balancer 100, is collected at a lower surface of the inside, flows to the left direction in the figure by the inclination to the lower left, and reaches the cut part 110. The structure for water draining is not limited to the cut part 110, which is a hole structure, and it can be a gap formed purposely.

(Function of Overhead Wire Tension Balancer)

FIG. 1 shows a condition in which tension is not applied to the overhead wire tension balancer 100. The supporting member 107 of the overhead wire tension balancer 100 shown in FIG. 1 is attached to a supporting pillar, not shown in the figure, and furthermore, the overhead wire is attached to the overhead wire attaching member 106, and thus the overhead wire is built. During this process; by the weight of the overhead wire and by a force pulling the overhead wire in the rightward direction in the figure, the overhead wire attaching member 106 is pulled relatively to the right direction in the figure.

On the other hand, since the coil springs 104 and 105 are compressed, in order to pull the inner cylindrical structural body 103 out of middle cylindrical structural body 102, and further, to pull the middle cylindrical structural body 102 out of the outer cylindrical structural body 101, a force larger than the elastic force of the coil springs 104 and 105 is required. A reactive force of this force corresponds to a tensile force acting on the overhead wire attached to the overhead wire attaching member 106. In this way, the tensile force toward the left direction which pulls an overhead wire, not shown in the figure and hangs to the right direction in FIG. 1 would be generated. This applying of the tensile force to the overhead wire is a function of the overhead wire tension balancer.

(Condition of Using of Overhead Wire Tension Balancer)

Figure 2:
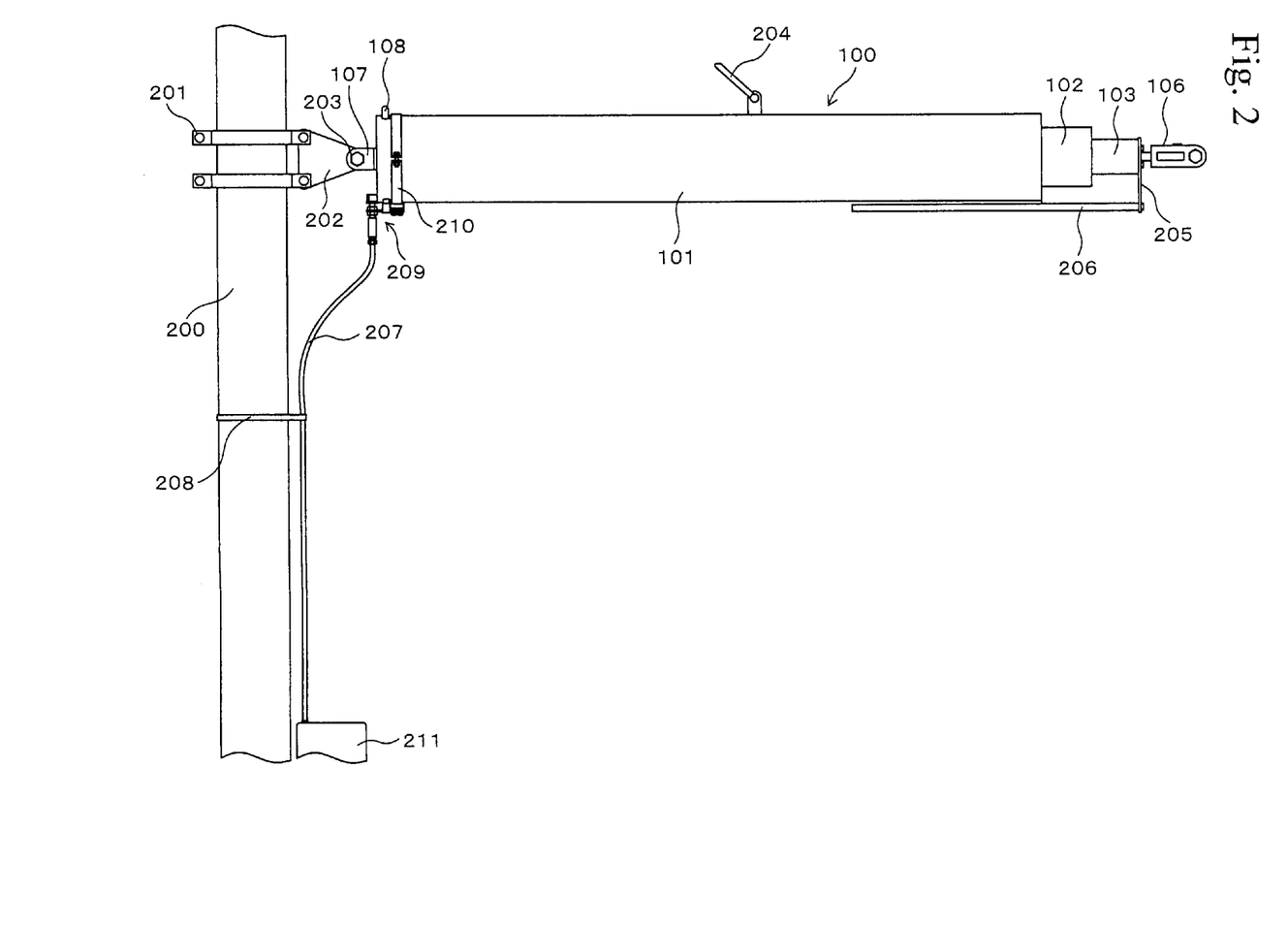
FIG. 2 is a side view showing a condition of arrangement of the overhead wire tension balancer using the present invention.

FIG. 2 is a side view showing a condition of using the overhead wire tension balancer 100 having a basic structure as shown in FIG. 1. In FIG. 2, the overhead wire tension balancer 100 is shown. In FIG. 2, one edge (left edge) of the overhead wire tension balancer is supported by the supporting pillar 200. That is, the attaching member 202 is fixed to the supporting pillar 200 by the attaching band 201. In addition, the supporting member 107 is fixed to the attaching member 202 by the bolt 203. One edge of the hanging member 204 is attached to an upper part of the outer cylindrical structural body 101, and the other edge of the hanging member 204, not shown in figure, is fixed to an upper part of the supporting pillar 200, not shown in the figure. Although it is omitted in the FIG. 2, one edge of the overhead wire, which is built so as to be extending in the rightward direction in the figure, is attached to the overhead wire attaching member 106.

In the example shown in FIG. 2, the scaling plate 206 is attached to the edge surface of the right edge of the inner cylindrical structural body 103 via the supporting member 205. The scaling plate 206 is used to confirm the amount of displacement of the inner cylindrical structural body 103 against the outer cylindrical structural body 101, in the condition of arrangement of overhead wire tension balancer 100. Although it is not obvious from FIG. 2, a situation shown in the figure is a slope inclining to the lower left, and the overhead wire tension balancer 100 is arranged in the condition of being inclined slightly (several degrees to the horizontal line) to lower left.

At the left edge of the overhead wire tension balancer 100 shown in FIG. 2, the collecting pipe 207, which is one example of the fluid collecting means, is attached. The collecting pipe 207 is made of resin, and is fixed to the supporting pillar 200 by the fixing member 208. A lower edge of the collecting pipe 207 is connected to the recovery tank 211. The recovery tank 211 is arranged to a root part of the supporting pillar 200, not shown in the figure.

(Connecting Structure of Collecting Pipe)

Figure 3A:
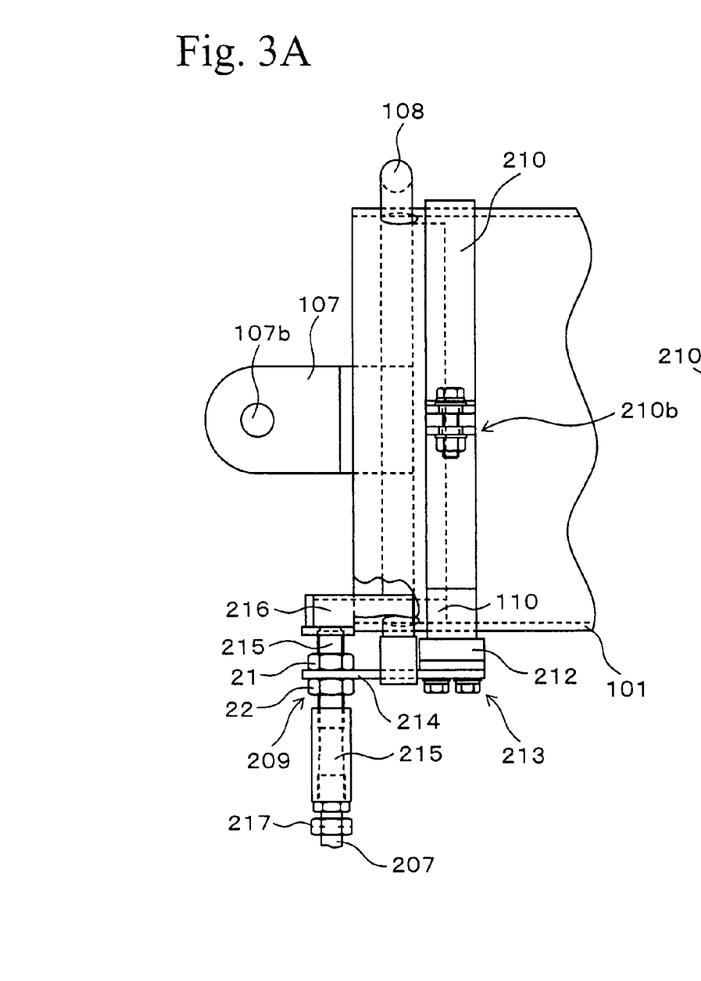
FIG. 3 is an enlarged side view (A) enlarging a part of FIG. 1, and a back view (B) seeing it from a direction 90° different from it.
Figure 3B:
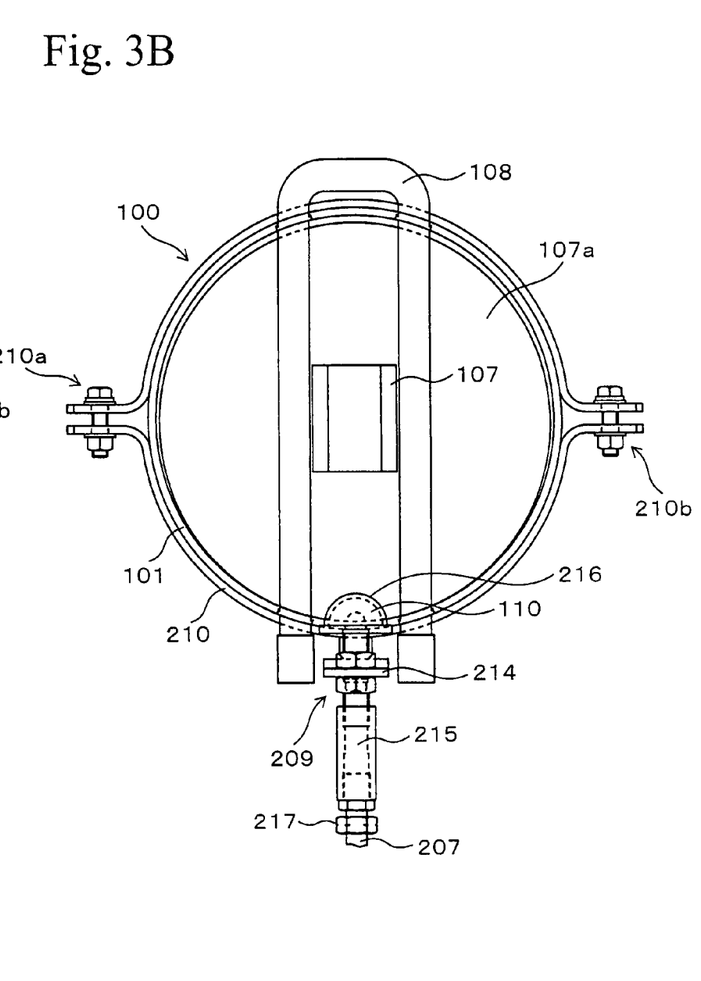

As shown in FIG. 2, the collecting pipe 207 is connected to the overhead wire tension balancer 100 at the collecting pipe connected part 209. The connecting structure is explained in detail as follows. FIG. 3 is an enlarged side view (A) enlarging the left edge part of the overhead wire tension balancer 100 shown in FIG. 2, and a back view (B) seen from the left direction.

The attaching band 210 is attached at the outer circumference of the outer cylindrical structural body 101. The attaching band 210 is tightened by a bolt at the tightened parts 210*a* and 210*b* and is fixed to the outer cylindrical structural body 101. The adjuster 212 is arranged at a lower part of the attaching band 210, and the supporting plate 214 is fixed to this adjuster 212 by the bolt 213. The cylindrical adaptor 215 is fixed to the supporting plate 214 by the nuts 21 and 22. The collecting pipe 207 is connected to the lower edge of the adaptor 215, and the draining tube 216 having an L-shaped pipe structure is connected to the upper edge of the adaptor 215. It should be noted that the reference numeral 217 indicates a connector that connects the adaptor 215 and the collecting pipe 207.

The right edge of the draining tube 216 has a shape which is fitted to the cut part 110 (see FIG. 1) having a semicircular shape, which is a hole for draining, and is contacted to it. According to this structure, rainwater and an oil component drained out of the cut part 110 would flow in the draining tube 216 to the left direction in the figure, then flow downward, and reach the collecting pipe 207 via the adaptor 215.

(Action of Prevention of Scattering of Oil Component)

The action of prevention of scattering of the oil component in the present embodiment is explained as follows, primarily by way of FIG. 2. First, it is assumed that the overhead wire tension balancer 100 shown in FIG. 2 is arranged in a condition being slightly inclined to the lower left of the figure. In addition, it is assumed that the cylindrical structural bodies are displaced from each other while an overhead wire, not shown in the figure, is attached to the overhead wire attaching member 106 and the overhead wire tension balancer 100 is pulled in the rightward direction in the figure against the supporting pillar 200 to apply tension to the overhead wire.

In this condition, by the passing of time, rainwater enters into the inside of the overhead wire tension balancer 100 via a gap between the cylindrical members existing at the right side of the overhead wire tension balancer 100. This rainwater is collected at the lower part of the overhead wire tension balancer 100, and migrates toward the collecting pipe connecting part 209 by the inclination of the overhead wire tension balancer 100.

On the other hand, by the passing of time, the oil component in the grease is separated because of solar heat or the passing of time, and this separated oil component is flowed by the above-mentioned rainwater and migrates to the collecting pipe connecting part 209 together with the rainwater. The rainwater and oil component are then flowed from the collecting pipe connecting part 209 to the collecting pipe 207, and then collected in the recovery tank 211.

According the action mentioned above, the rainwater and oil component are not scattered from the overhead wire tension balancer 100, and they are collected in the recovery tank 211. In this way, the problem of scattering of the oil component can be solved.

(Example of Attachment to Conventional Overhead Wire Tension Balancer)

The construction which prevents the oil component from being scattered, shown in FIGS. 2 and 3, can be attached to an overhead wire tension balancer which is already arranged in the field. One example of the method for attaching in this case is explained as follows.

First, it is assumed that the conventional overhead wire tension balancer 100 does not have the collecting pipe connecting part 209 and the collecting pipe 207 shown in FIGS. 2 and 3 already constructed, and it is also assumed that the collecting pipe 207 and the recovery tank 211 are not arranged at the supporting pillar 200.

In this condition, first, as shown in FIG. 3, the attaching band 210 having the adjuster 212 is attached to the outer cylindrical structural body 101. Next, the adaptor 215 is attached to the draining tube 216. Furthermore, the adaptor 215 on which the supporting plate 214 is attached is prepared. The entrance of the draining tube 216 is fitted to the cut part 110, the nuts 21 and 22 are revolved in that condition, and the height of the supporting plate 214 is adjusted to be fitted to the lower surface of the adjuster 212.

Then, the bolt 213 is tightened in the condition that the height of the supporting plate 214 is fitted to the lower surface of the adjuster 212 to fix the supporting plate 214 to the adjuster 212. Next, the connector 217 is attached to the adaptor 215, and furthermore, the collecting pipe 207 is connected to the lower edge of the adaptor 215. Furthermore, as shown in FIG. 2, the draining tank 211 is arranged at the lower part of the supporting pillar 200, and the collecting pipe 207 is pulled downwardly along the supporting pillar 200, to connect the tip thereof to the recovery tank 211. Thus, the condition shown in FIGS. 2 and 3 is accomplished.

By this embodiment, in the situation in which a conventional overhead wire tension balancer having a structure for draining rainwater to the outside is used, and by adding the above-mentioned additional device to the device already built, the structure preventing the oil component of grease from being scattered can be obtained. This additional structure consists of small numbers of parts, and the attaching process thereof is easy as described above. Therefore, the above-mentioned embodiment can be performed at low cost.
(Summary)

As explained above, in the present embodiment, the outer cylindrical structural body 101, the middle cylindrical structural body 102 and the inner cylindrical structural body 103 which are examples of coaxially arranged plural cylindrical members, are shown. In the present embodiment, the coil springs 104 and 105 which apply elastic force to a relative extension in axial direction between the above-mentioned plural cylindrical members, are shown. In the present embodiment, the grease as a lubricating agent is applied on the coil springs 104 and 105. In the present embodiment, the cut part 110 which functions as a water draining hole as one example of water draining means draining rainwater retained in a gap between the above-mentioned plural cylindrical members to outside, is shown. In the present invention, as one example of the fluid collecting means collecting fluid flowed out of the above-mentioned water draining means (cut part 110), the collecting pipe 207 is shown.

Furthermore, in the present embodiment, the device for preventing lubricating oil from being scattered, which is attached to the overhead wire tension balancer 100 having a hole or gap for water draining, is shown. This device for preventing lubricating oil from being scattered has the collecting pipe connecting part 209, which is one example of the connecting member for collection connected to the hole or gap for water draining, the collecting pipe 207 which is connected to this connecting member for collection, and the attaching member 214 which attaches the collecting pipe connecting part 209 and the collecting pipe 207 to the overhead wire tension balancer 100.
(Variations)

As a variation of the present invention, the recovery tank 211 is omitted and the tip of the collecting pipe (draining side) is arranged at a side ditch or the like, and therefore the oil component and rainwater can be drained thereto. It is desirable that the oil component and rainwater collected in the side ditch or the like be collected in an effluent treatment facility or the like.

In the above explanation, as one example of the overhead wire tension balancer, the structure in which the cylindrical structural body consists of three layer and is pulled in two steps is explained; however, the number of layers is not limited to three, and it can be two, four or more. The cross sectional shape of the cylindrical structural body is not limited to being circular, and it can be a polygonal shape such as a square, hexagon or the like.

As the fluid collecting means, a construction in which the rainwater and oil component inside the overhead wire tension balancer is collected directly to the recovery tank, not via the collecting pipe, can be employed. In this case, the recovery tank is directly connected to the overhead wire tension balancer. The material of the collecting pipe is not limited to a resin, and it can be metal.

(2) Second Embodiment

Structure of Overhead Wire Tension Balancer

Figure 4:
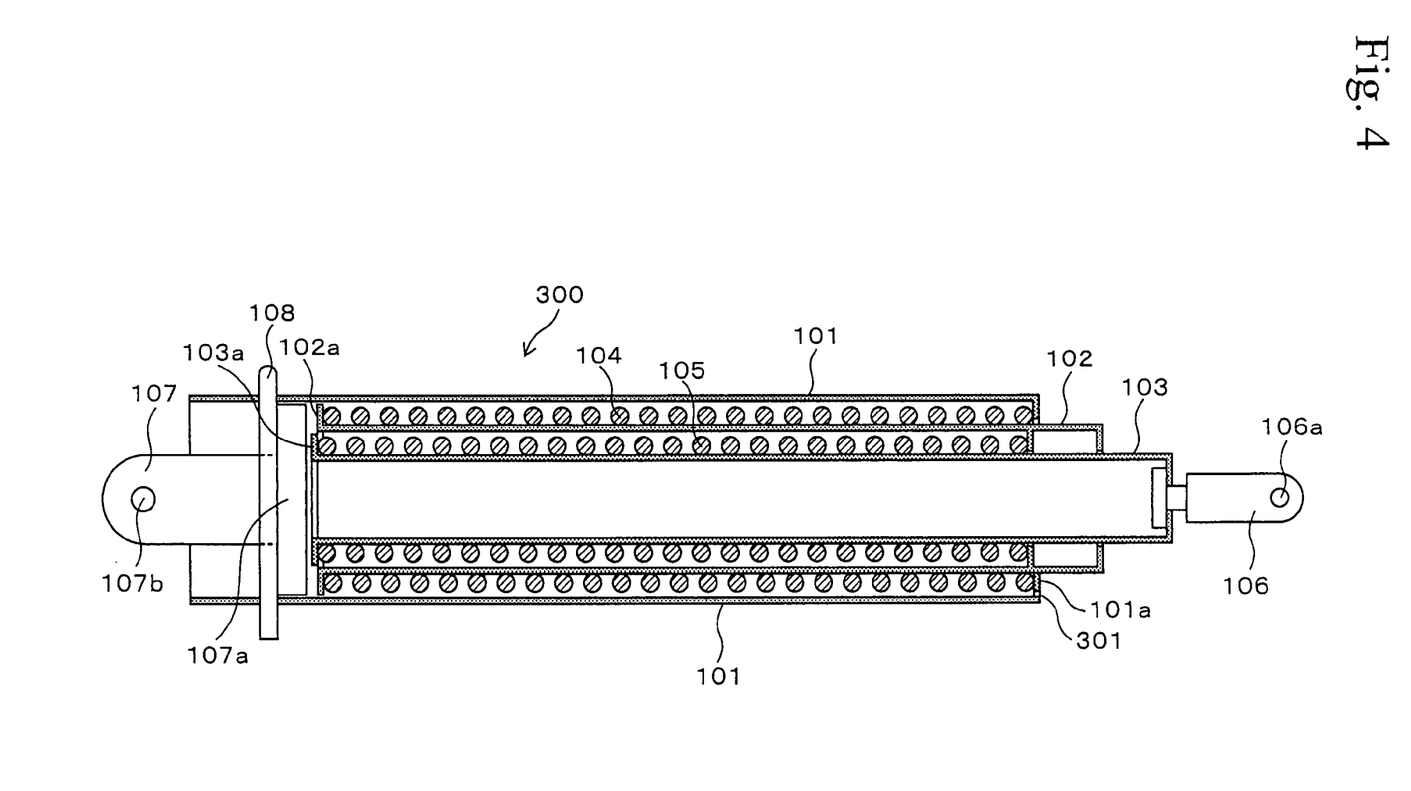
FIG. 4 is a cross sectional view showing the concept of an overhead wire tension balancer to which the present invention is applied.

Next, an overhead wire tension balancer in which water is drained at a position different from that of the structure shown in FIGS. 1 to 3, is explained as follows. FIG. 4 is a cross sectional view showing another example of an overhead wire tension balancer. FIG. 4 shows the overhead wire tension balancer 300. The tension balancer 300 is used in a condition in which it is inclined to lower right of the figure.

The position of the water draining means of the overhead wire tension balancer 300 is different from that of the overhead wire tension balancer 100. The overhead wire tension balancer 300 shown in FIG. 4 has the water draining hole 301 as the water draining means. This water draining hole 301 is arranged at the edge surface of the overhead wire side in the axial direction of the overhead wire tension balancer 300, more particularly, at the central lower edge part of the inner flange part 101a of the outer cylindrical structural body 101. The construction of the overhead wire tension balancer 300 except for the water draining means is similar to that of the overhead wire tension balancer 100 shown in FIG. 1.
(Rainwater Collecting Structure)

Figure 5:
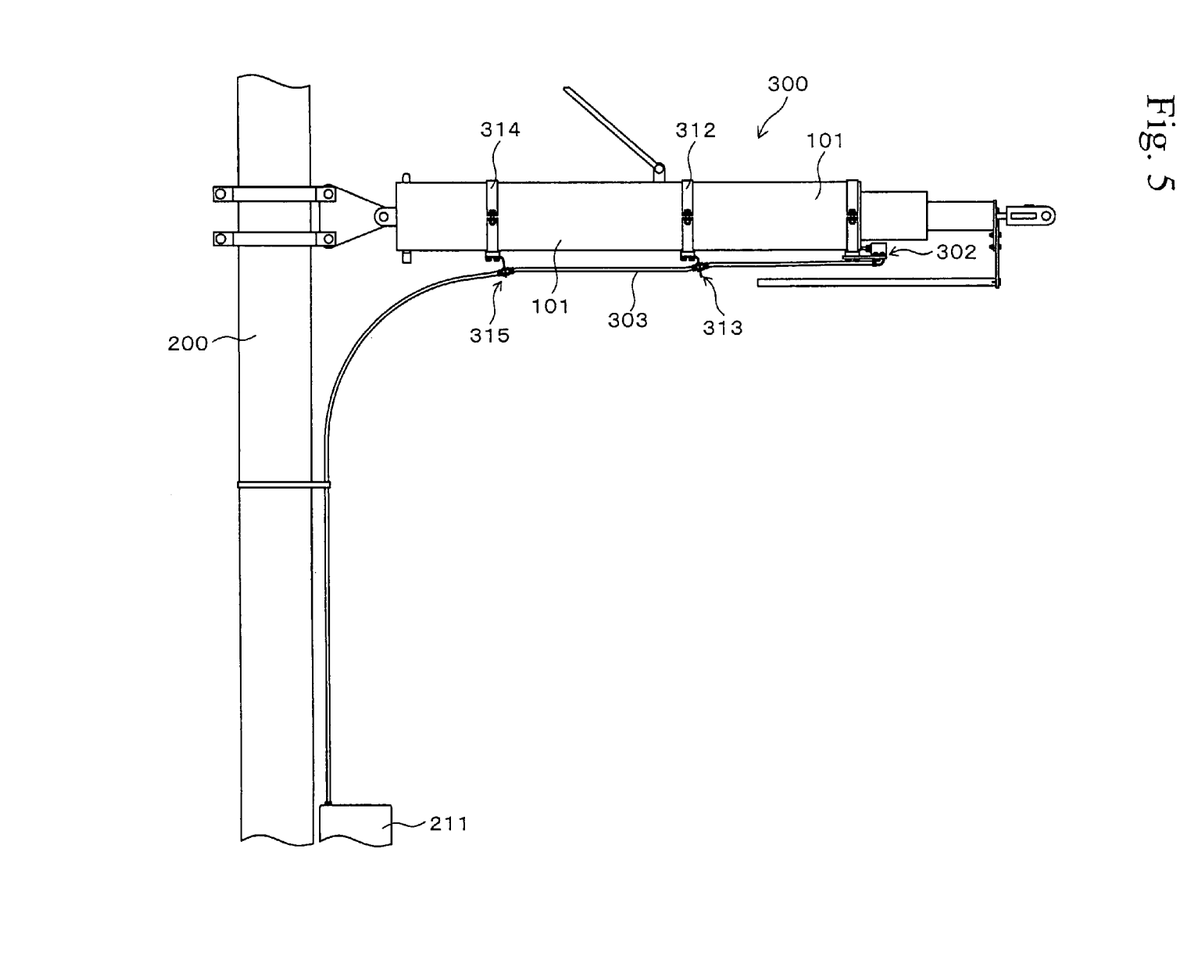
FIG. 5 is a side view showing a condition of arrangement of the overhead wire tension balancer using the present invention.

FIG. 5 is a side view showing a situation in which the overhead wire tension balancer 300 shown in FIG. 4 is used. In FIG. 5, parts having reference numeral the same as in FIG. 2 are similar to those in FIG. 2, which are already explained above. Furthermore, parts not explained above are also as the same as in FIG. 2 as long as drawings of the parts are the same. In the example shown in FIG. 5, the water draining hole is formed at the inner flange part 101a (see FIG. 4) of the outer cylindrical structural body 101, and the collecting pipe connecting part 302 is attached thereto. The collecting pipe 303 is connected to the collecting pipe connecting part 302. The collecting pipe 303 is supported under the outer cylindrical structural body 101 so as to be inclined to the lower left in the left direction in the figure, and further is arranged downwardly along the supporting pillar 200. The lower edge of the collecting pipe 303 is connected to the recovery tank 211.

Figure 6:
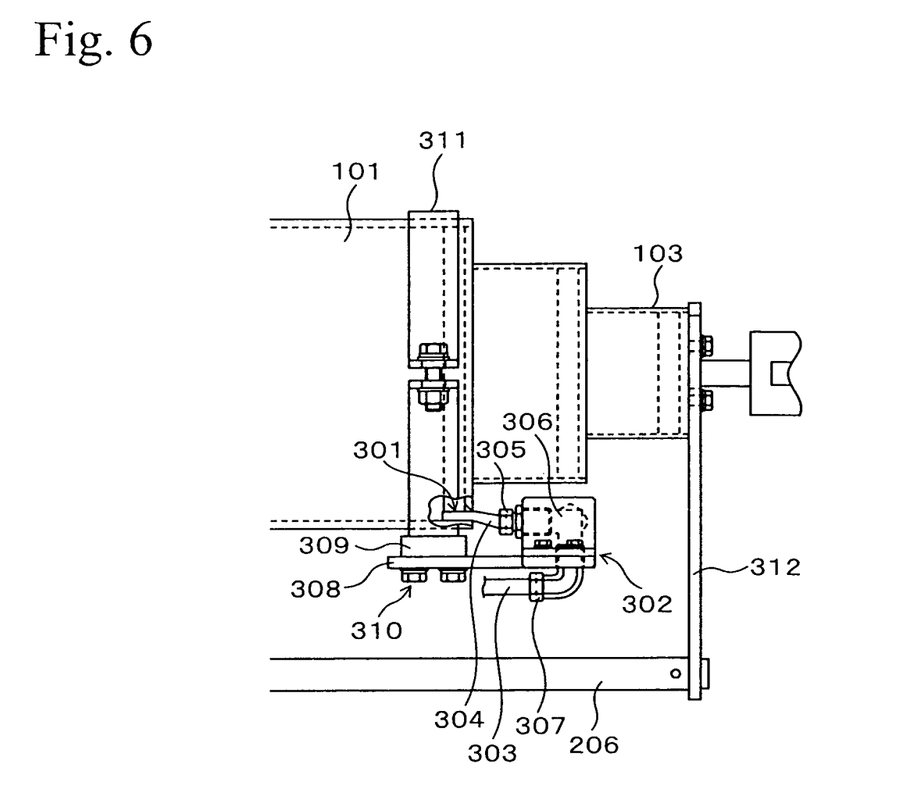
FIG. 6 is an enlarged side view enlarging a part of FIG. 5.

FIG. 6 is a side view showing the collecting pipe connecting part 302 in detail. As shown in FIG. 6, the collecting pipe connecting part 302 has the collecting nozzle 304 inserted into the water draining hole 301, also shown in FIG. 4, and the draining tube 306. The collecting nozzle 304 is connected to the draining tube 306 by the connector 305. The draining tube 306 has an asymmetric U shape, and at the edge thereof opposite to the edge at which the collecting nozzle 304 is connected, the collecting pipe 303 is connected by the connector 307.

The draining tube 306 is fixed to the supporting plate 308. The supporting plate 308 is fixed to the adjuster 309 by the bolt 310. The adjuster 309 is fixed to the attaching band 311 which is wound around the outer cylindrical structural body 101 to be fixed.

In the construction shown in FIG. 6, the extension supporting member 312 is attached to the edge surface of the inner cylindrical structural body 103, and the scaling plate 206 is attached to this extension supporting member 312.

Again returning to the FIG. 5, the collecting pipe 303 connected to the collecting pipe connecting part 302, is built toward the left direction of the figure under the overhead wire tension balancer 300. In this example, by the supporting members 313 and 315, the collecting pipe 303 extending from the collecting pipe connecting part 302 in the left direction is supported by the overhead wire tension balancer 300 from above. The supporting members 313 and 315 are fixed to the outer cylindrical structural body 101 mutually by the attaching bands 312 and 314.

In the supporting members 313 and 315, distance between the overhead wire tension balancer 300 and supporting part is adjusted so that the collecting pipe 303 is inclined to the lower left. Explanation is omitted since the other construction is similar to that of the first embodiment shown in FIG. 1.

In this example, rainwater and oil component of grease retained inside of the outer cylindrical structural body 101 flow to the collecting pipe 303 via the collecting pipe connecting part 302, and they are collected in the recovery tank 211.

(3) Third Embodiment (Structure of Overhead Wire Tension Balancer)

Figure 7:
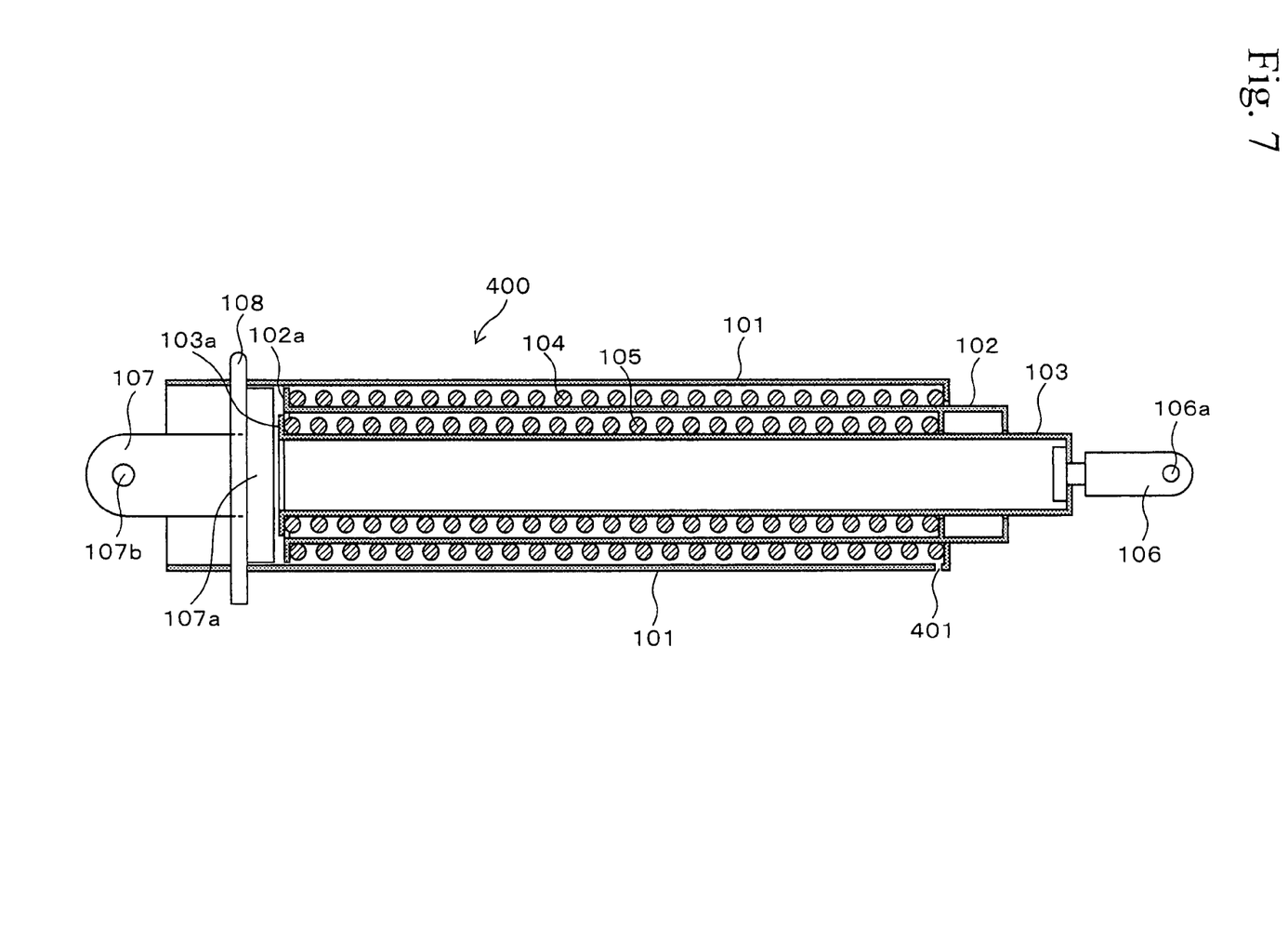
FIG. 7 is a cross sectional view showing the concept of an overhead wire tension balancer to which the present invention is applied.

FIG. 7 is a cross sectional view showing another example of overhead wire tension balancer. FIG. 7 shows the overhead wire tension balancer 400. The overhead wire tension balancer 400 is used in condition of being inclined to the lower right of the figure.

Position of the water draining means of the overhead wire tension balancer 400 is different from that of the overhead wire tension balancer 100. The overhead wire tension balancer 400 shown in FIG. 7 has the water draining hole 401 as the water draining means. This water draining hole 401 is arranged at the lower side of one side of the overhead wire tension balancer 400 of which an overhead wire is connected, more particularly, at the lower side of near the edge part of the outer cylindrical structural body 101. The construction of the overhead wire tension balancer 400 except for the water draining means is similar to that of the overhead wire tension balancer 100 shown in FIG. 1.

(Rainwater Collecting Structure)

Figure 8:
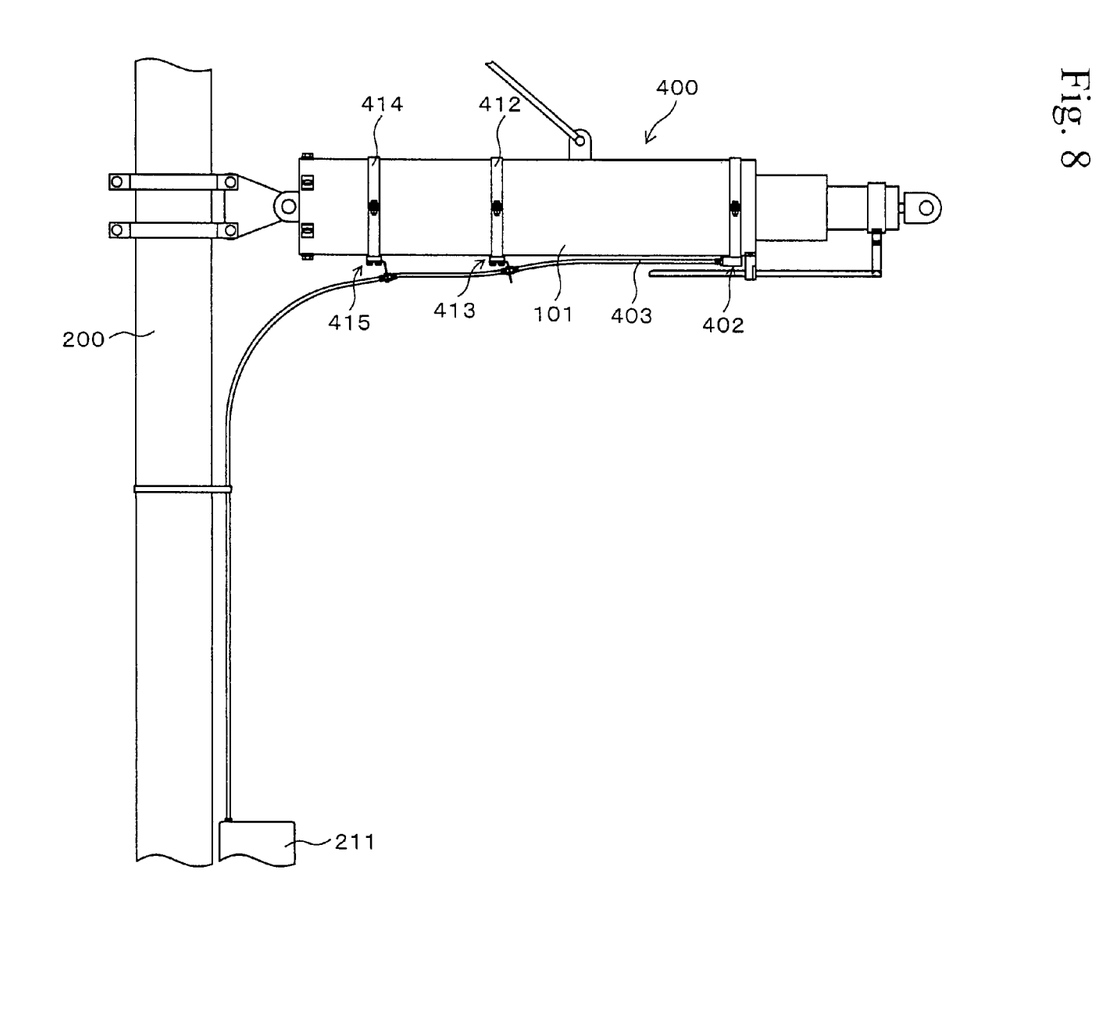
FIG. 8 is a side view showing a condition of arrangement of the overhead wire tension balancer using the present invention.

FIG. 8 is a side view showing a situation in which the overhead wire tension balancer 400 shown in FIG. 7 is used. In FIG. 8, parts having reference numerals the same as in FIG. 2 are similar to those in FIG. 2, which are already explained above. Furthermore, parts not explained above are also the same as in FIG. 2 as long as the drawings of the parts are the same. In the example shown in FIG. 8, the water draining hole is formed at the downward of the outer cylindrical structural body 101, and the collecting pipe connecting part 402 is attached thereto. The collecting pipe 403 is connected to the collecting pipe connecting part 402. The collecting pipe 403 is supported under the outer cylindrical structural body 101 so as to be inclined to the lower left in left direction of the figure, and further is arranged downwardly along the supporting pillar 200. The lower edge of the collecting pipe 403 is connected to the recovery tank 211.

Figure 9:
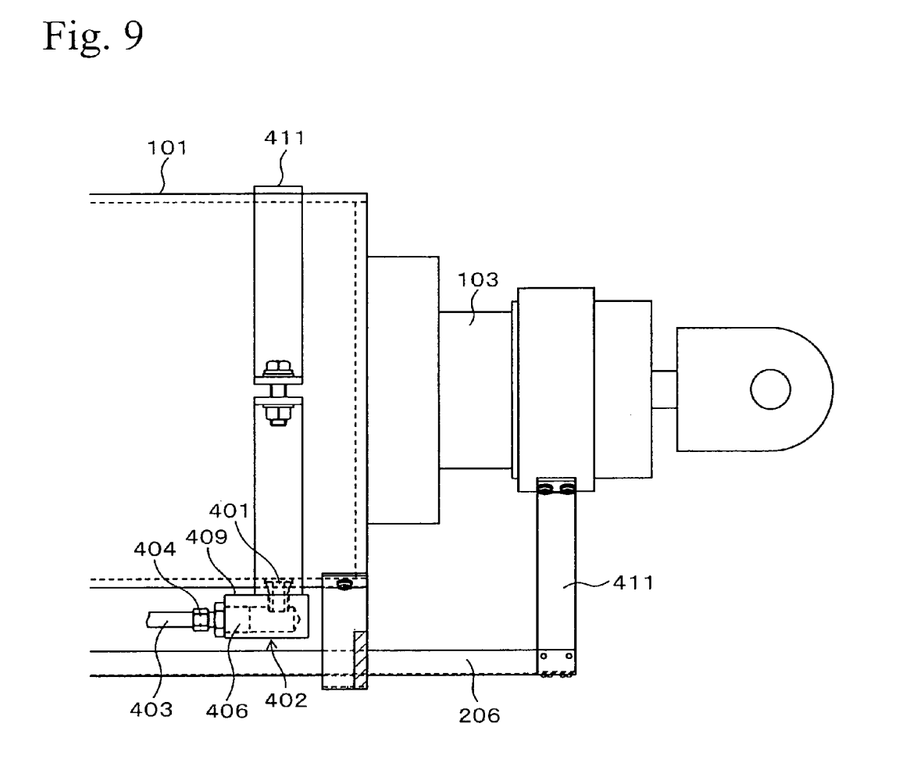
FIG. 9 is an enlarged side view enlarging a part of FIG. 8.

FIG. 9 is a side view showing the collecting pipe connecting part 402 in detail. As shown in FIG. 9, the collecting pipe connecting part 402 has the structure in which the draining tube 406 is inserted into the water draining hole 401 also shown in FIG. 7 from below. The draining tube 406 has an L shape, and its one edge is connected to the overhead wire tension balancer 400 and the other edge is connected to the collecting pipe 403 by the connector 404. The draining tube 406 is contained in the case 409. The case 409 is fixed to the attaching band 411 which is wound around the outer cylindrical structural body 101 to be fixed. That is, the draining tube 406 is fixed to the outer cylindrical structural body 101 by the attaching band 411. In the construction shown in FIG. 9, the scaling plate 206 is attached by the attaching member 411 which is fixed on an outer circumference of the inner cylindrical structural body 103.

Again returning to the FIG. 8, the collecting pipe 403 connected to the collecting pipe connecting part 402, is built toward the left direction in the figure under the overhead wire tension balancer 400. In this example, by the supporting members 413 and 415, the collecting pipe 403 extending from the collecting pipe connecting part 402 to the left direction is supported by the overhead wire tension balancer 400 from above. The supporting members 413 and 415 are fixed to the outer cylindrical structural body 101 mutually by the attaching bands 412 and 414.

In the supporting members 413 and 415, distance between the overhead wire tension balancer 400 and supporting part is adjusted so that the collecting pipe 403 is inclined to the lower left. Explanation is omitted since the other construction is similar to that of the first embodiment.

In this example, rainwater and oil component of grease retained inside of the outer cylindrical structural body 101 flow to the collecting pipe 403 via the collecting pipe connecting part 402, and they are collected in the recovery tank 211.

(4) Fourth Embodiment

Next, an example in which a waterproof cover is further attached in addition to the first embodiment, is explained. In the example shown in FIG. 2, rainwater that has entered into the overhead wire tension balancer is collected and drained to the outside without being scattered. In addition to this construction, by preventing rainwater from entering into the overhead wire tension balancer, deficiencies occurred by entry of rainwater (for example, corrosion of constituent members, deterioration of grease, or reduction of effective component in grease by draining) can be restrained.

(Structure)

Figure 10A:
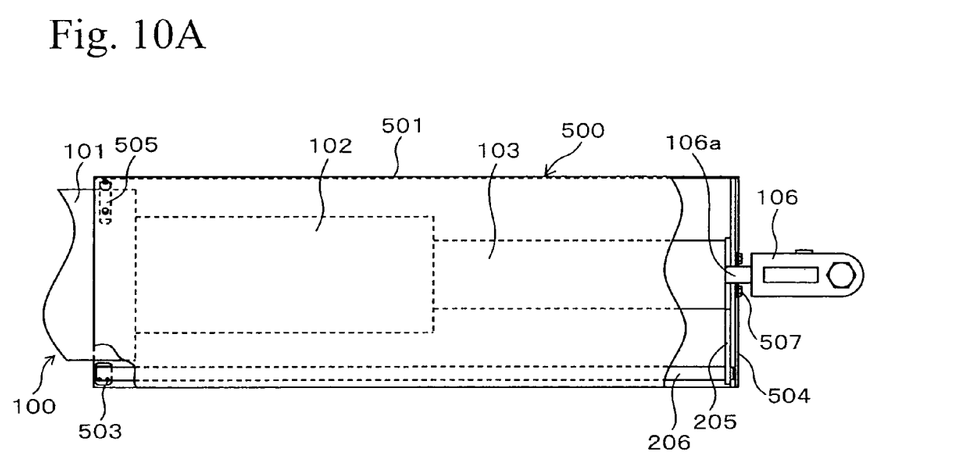
FIG. 10 is a side view (A) showing a condition in which a waterproof cover is attached to a structure shown in FIG. 2, and a front view (B).

FIG. 10 is a side view (A) showing a situation in which the waterproof cover is attached in addition to the construction of FIG. 2, and a front view (A) of which the construction of (A) is seen from the right direction. It should be noted that FIG. 10 shows a situation in which the overhead wire tension balancer 100 is extended maximally and that description of an overhead wire will be omitted.

FIG. 10 shows the waterproof cover 500. The waterproof cover 500 has the covering member 501 and the bottom plate member 502. The covering member 501 has a roof structure in which an upper part is bent in a semicircular shape, and has a longitudinal shape extending to an axial direction of the overhead wire tension balancer 100. The lower side of the roof structure is an open structure, and the bottom plate member 502 is attached thereto by the screw 503. The scaling plate 206 positions at the lower part of the bottom plate member 502. In a condition in which the waterproof cover 500 is attached, the length of which the overhead wire attaching member 106 is pulled from the outer cylindrical structural body 101, can be confirmed.

At a side of the supporting pillar of upper and inside part of the covering member 501 (near left edge of the figure), the cushioning member 505 is attached. The cushioning member 505 is made of rubber or resin, and contacts to the upper surface of the outer cylindrical structural body 101 in a condition in which sliding is possible. The part of the cushioning member 505 where it contacts with the outer cylindrical structural body 101, is processed to have a surface having few convex and concave portions in order to slide smoothly against each other.

Figure 10B:
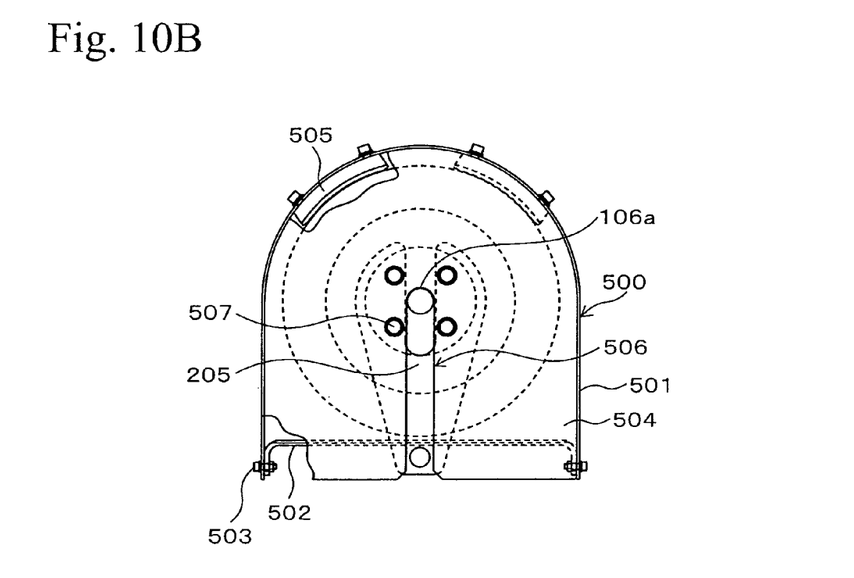

Regarding the edge parts in axial direction of the covering member 501, the overhead wire side (right side of the figure) is sealed with the edge surface plate 504 unified with the covering member 501, and the supporting pillar side (left side of the figure) is opened. The slit 506 extending in the up-down direction is formed on the edge surface plate 504, and the overhead wire attaching member 106 can be projected therethrough to the outside (right side of the figure). In FIG. 10B, description of the overhead wire attaching member 106 is omitted, and the cross section of the axis 106a at the overhead wire tension balancer 100 side of the overhead wire attaching member 106 is drawn.

(Method for Attaching)

One example of working steps for attaching the waterproof cover 500 shown in FIG. 10 to the overhead wire tension balancer 100 is explained as follows. Here, in a situation in which the overhead wire tension balancer 100 is actually used (situation of supporting overhead wire), a case of attaching the waterproof cover 500 is explained.

First, the supporting member 205 and the scaling plate 206 are detached from the overhead wire tension balancer 100. Next, the covering member 501 from which the bottom plate member 502 is detached is covered over the overhead wire tension balancer 100 from the upward direction, and the cushioning member 505 is contacted with the upper surface of the outer cylindrical structural body 101. At this time, the slit 506 is aligned with the axis 106a of the overhead wire attaching member 106, and the position is adjusted so that the axis 106a projects to the rightward direction of the figure through the slit 506.

Next, a gap is made between the edge surface plate 504 and the inner cylindrical structural body 103, the supporting member 205 unified with the scaling plate 206 is inserted into the gap, and the position is adjusted. In this time, the position of the edge surface plate 504 is adjusted at the same time, and the supporting member 205 together with the edge surface plate 504 are fixed to the edge surface of the inner cylindrical structural body 103 by tightened with the bolt 507. Since the edge surface plate 504 has a structure unified with the covering member 501, by the fixation above, the covering member 501 is fixed with the overhead wire tension balancer 100.

Next, the bottom plate member 502 is inserted into the gap between the scaling plate 206 and the lower part of the outer cylindrical structural body 101 from left direction of FIG. 10, and they are aligned. The bottom plate member 502 is fixed to the inside of the covering member 501 by the screw 503. Thus, the condition shown in FIG. 10 is accomplished.

(Superiority)

According to the construction shown in FIG. 10, by the waterproof cover 500, it becomes difficult for rainwater to enter into the inside of the overhead wire tension balancer 100 from the right side of the figure. Furthermore, the waterproof structure shown in FIG. 10 can be attached to a conventional overhead wire tension balancer 100 that is already built. By utilizing device already built, costs for parts and labor can be reduced.

The present invention can be used for an overhead wire tension balancer which gives tensile force to an overhead wire of a railroad or the like and supports it.

The invention claimed is:

1. An overhead wire tension balancer device comprising:
   cylindrical members arranged coaxially and including an outermost cylindrical member with an inner flange part,
   a coil spring applying elastic force against relative extension of the cylindrical members in an axial direction,
   a lubricating agent applied on the coil spring,
   a draining means for draining rainwater retained in a gap between the cylindrical members to the outside and being arranged at: (1) a central lower edge part of the inner flange part of the outermost cylindrical member, or (2) a lower side near an edge part of the outermost cylindrical member, and
   a fluid collecting means for collecting a fluid that has flowed out of the draining means.

2. The overhead wire tension balancer device according to claim 1, wherein the water draining means is a hole or a gap, and the fluid collecting means is a pipe connected to the hole or the gap.

3. A device for prevention of scattering lubricating oil, which is made so as to be attached to an overhead wire tension balancer having a hole or gap for water draining and having cylindrical members that are coaxially arranged, the cylindrical members including an outermost cylindrical member with an inner flange part, and the hole or gap is arranged at a central lower edge part of the inner flange part of the outermost cylindrical member or at a lower side near an edge part of the outermost cylindrical member, the device comprising:
   a connecting member for collection that is connected to the hole or gap for water draining,
   a pipe connected to the connecting member for collection, and
   an attaching member configured to attach the connecting member for collection and the pipe to the overhead wire tension balancer.

* * * * *